United States Patent
Baskin (12)

(10) Patent No.: US 6,542,589 B1
(45) Date of Patent: Apr. 1, 2003

(54) METHOD OF TELEPHONE ACCESS TO INTERNET SECRETARIAL SERVICES

(76) Inventor: Douglas M. Baskin, 1 Oceans West Blvd. #16B2, Daytona Beach Shores, FL (US) 32118

( * ) Notice: Subject to any disclaimer, the term of this patent is extended or adjusted under 35 U.S.C. 154(b) by 131 days.

(21) Appl. No.: 09/711,765

(22) Filed: Nov. 13, 2000

(51) Int. Cl.[7] .......................... H04M 15/00; G06F 19/00
(52) U.S. Cl. .............................. 379/114.05; 379/201.01; 379/900; 704/270.1
(58) Field of Search ...................... 379/114.01, 114.19, 379/114.24, 114.25, 115.01, 121.01, 143, 144.01, 153, 155, 900, 114.052, 201.01; 707/3, 10; 704/270.1, 271, 275

(56) References Cited

U.S. PATENT DOCUMENTS

| | | | |
|---|---|---|---|
| 5,729,598 A | 3/1998 | Kay ............................. 379/115 |
| 5,737,414 A | * 4/1998 | Walker et al. .................. 380/4 |
| 5,745,556 A | * 4/1998 | Ronen ......................... 379/127 |
| 5,745,884 A | 4/1998 | Carnegie et al. |
| 5,771,273 A | 6/1998 | McAllester et al. ........ 379/67.1 |
| 5,794,221 A | * 8/1998 | Egendorf ...................... 395/201 |
| 5,802,283 A | 9/1998 | Grady et al. |
| 5,884,262 A | * 3/1999 | Wise et al. ................... 704/270 |
| 5,889,845 A | 3/1999 | Staples et al. ................ 379/211 |
| 5,995,138 A | 11/1999 | Beer et al. ..................... 348/96 |
| 6,028,917 A | 2/2000 | Creamer et al. ........ 379/100.01 |
| 6,031,975 A | 2/2000 | Iijima |
| 6,243,450 B1 | * 6/2001 | Jansen et al. ................. 379/144 |
| 6,292,478 B1 | * 9/2001 | Farris .......................... 370/352 |
| 6,314,169 B1 | * 11/2001 | Schelberg, Jr. et al. .. 379/93.12 |
| 2002/0049833 A1 | * 4/2002 | Kikinis ........................ 709/219 |

* cited by examiner

*Primary Examiner*—Binh Tieu
(74) *Attorney, Agent, or Firm*—Paul S. Rooy, P.A.

(57) ABSTRACT

A method of telephone access to internet secretarial services. A client makes a telephonic information request to the internet secretary, who is in contact with the internet via high-speed internet connection. The internet secretary sends an internet search query, and forwards the resultant search results to the client. In one embodiment of the instant invention, the client uses toll telephone lines (such as a "900") number. A telephone company receives call rate and time information, and forwards secretarial services charges to the internet secretary. The client pays the telephone company for secretarial services charges and telephone service costs. In an alternate embodiment of the instant method the client calls the internet secretary via toll-free lines, and supplies the internet secretary credit card information and/or debit card information to pay the secretarial services charges. The internet secretary pays the telephone communications costs. In either embodiment, the client may request that the internet secretary transmit information to one or more third parties, and pay for this service via credit card and/or debit card.

12 Claims, 4 Drawing Sheets

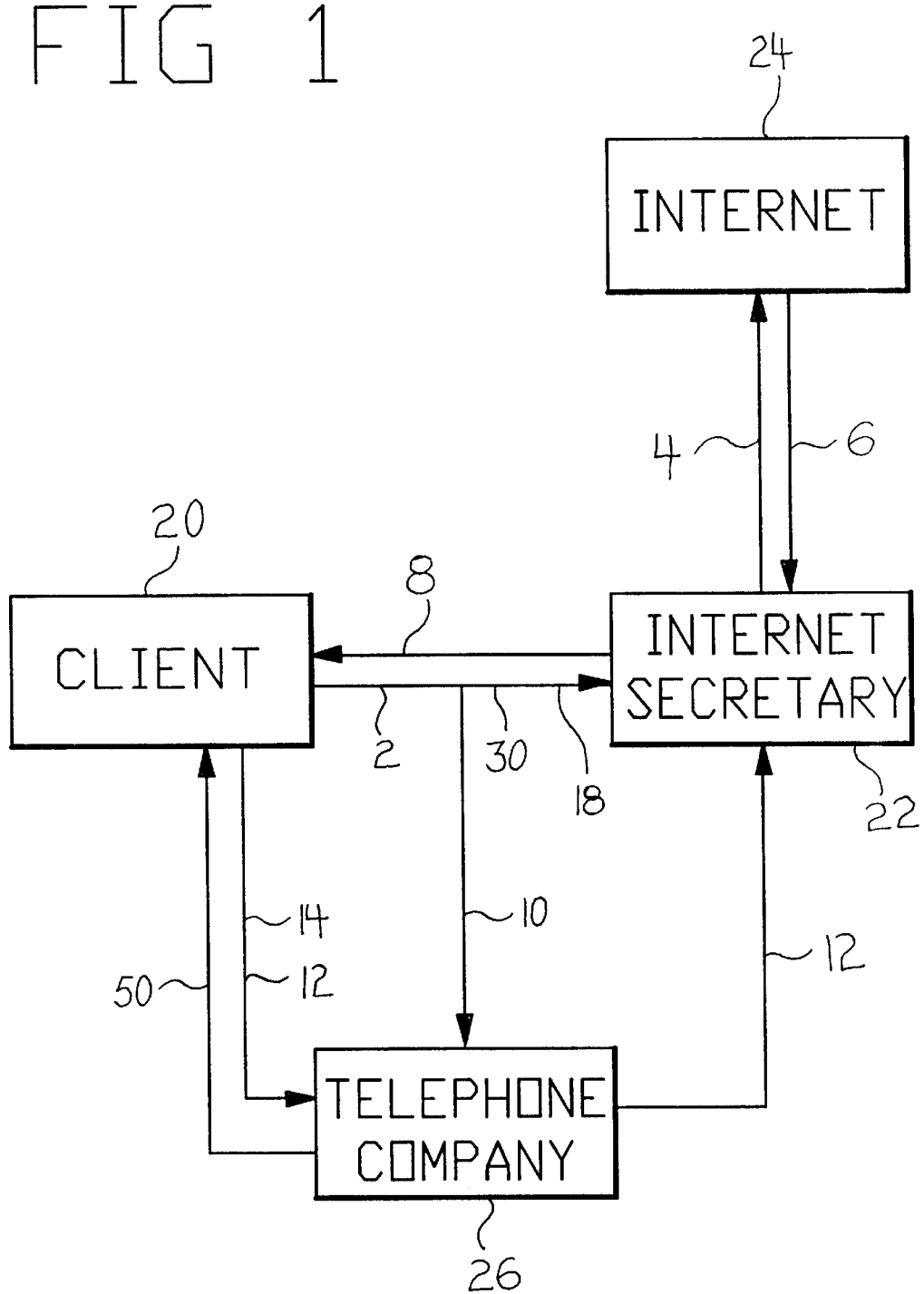

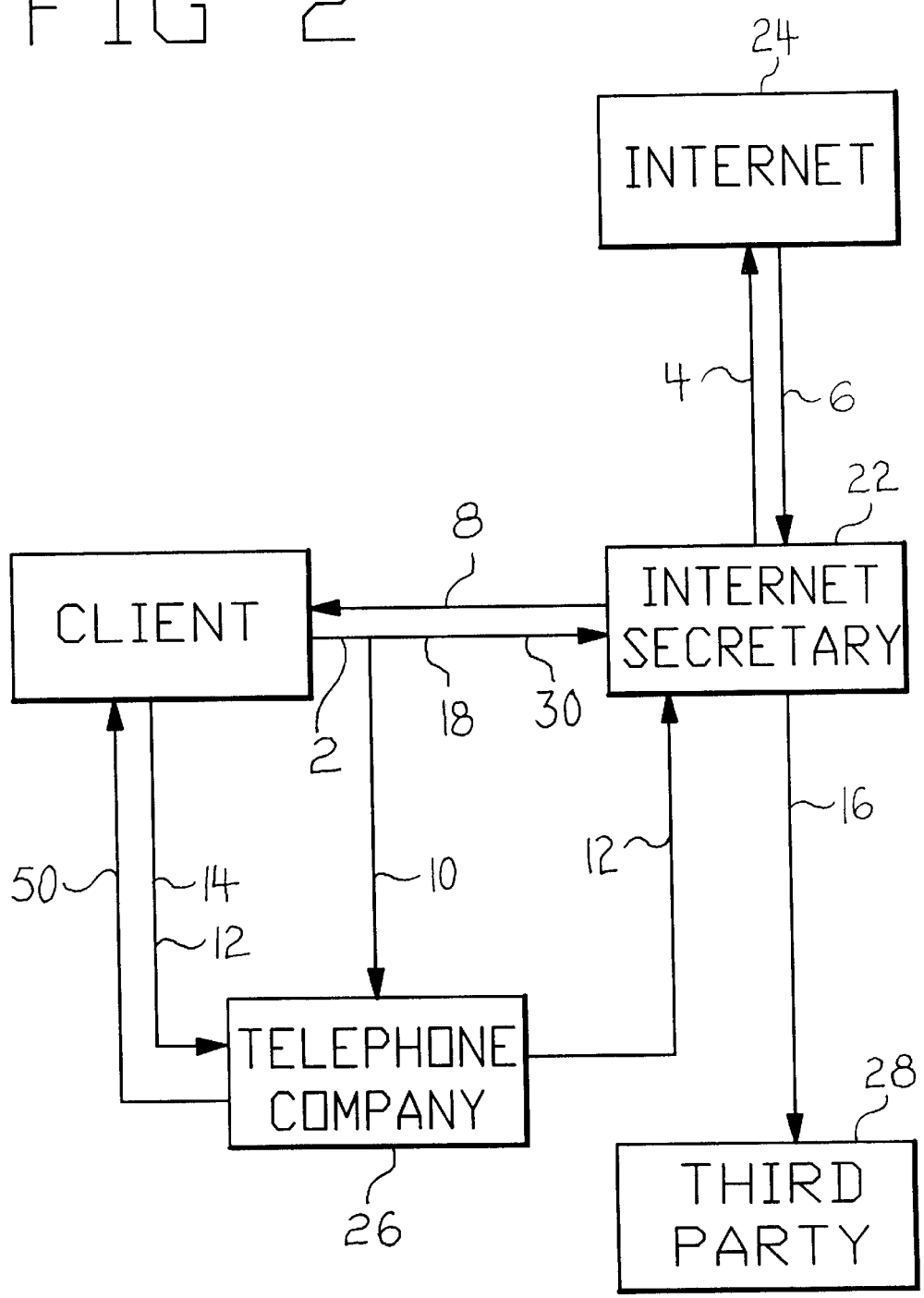

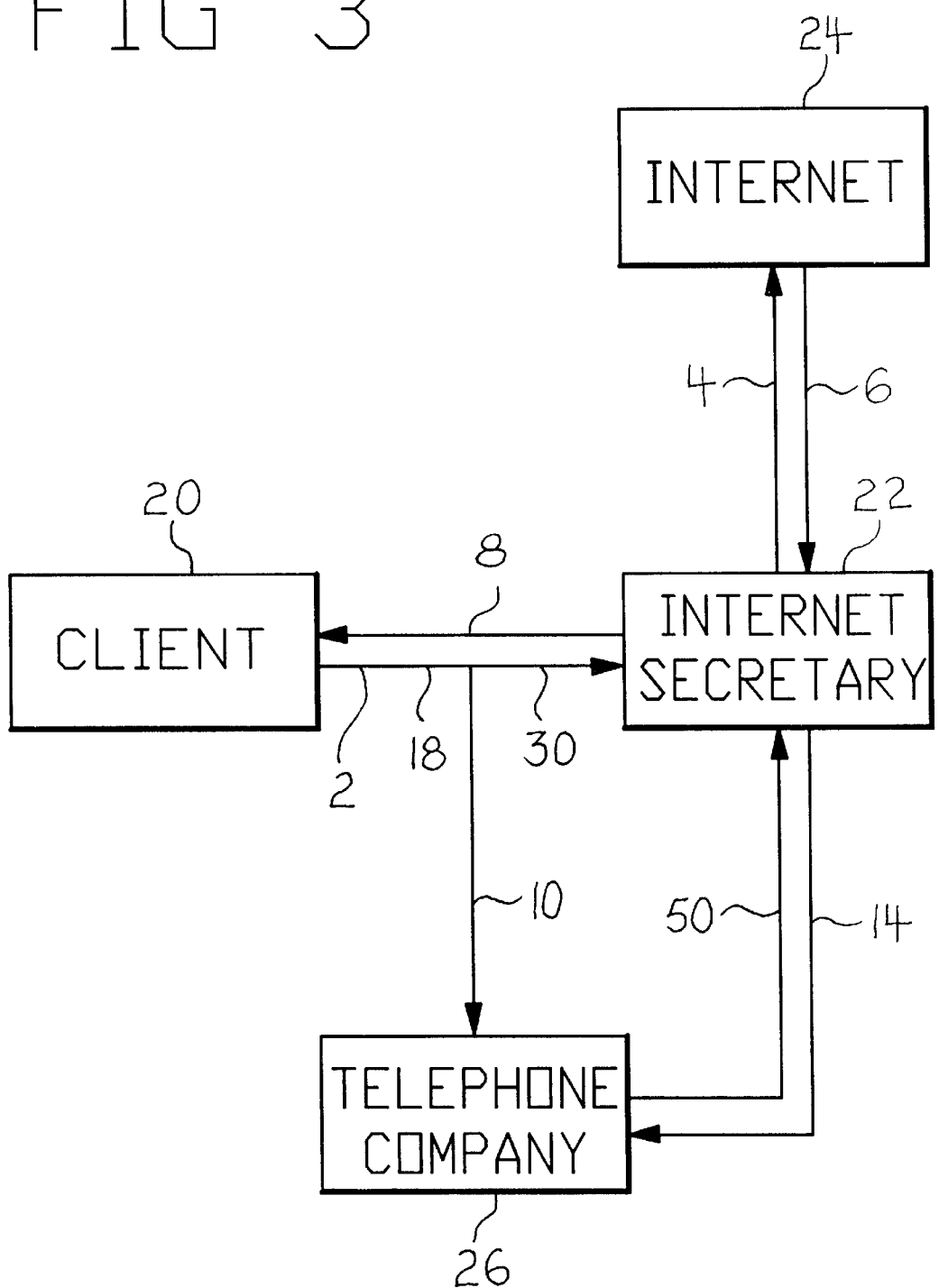

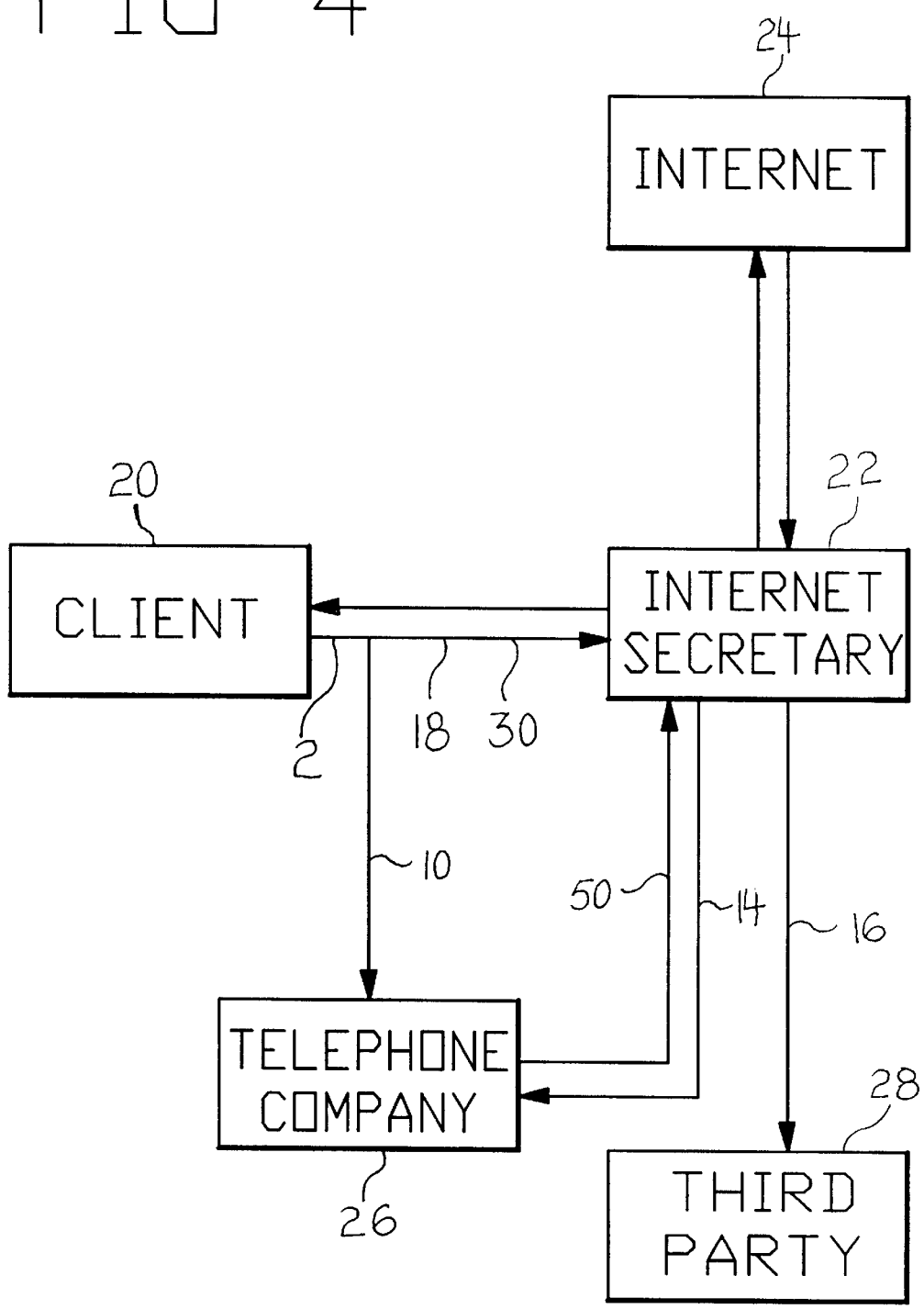

METHOD OF TELEPHONE ACCESS TO INTERNET SECRETARIAL SERVICES

BACKGROUND OF THE INVENTION

1. Field of the Invention

This invention relates to methods of providing internet secretarial services, and in particular to a method of telephone access to internet secretarial services.

2. Background of the Invention

Today's age of digital communications permits faster and more efficient data transfer than has ever before been available. Methods of digital communication include e-mail, the transmission of documents via facsimile, and digital communications to and between internet web sites.

Thus it has become very important for individuals to be able to quickly and easily access the capability of digitally communicating, as well as the ability to quickly and easily harvest information from the internet.

Although modems and laptop computers are commercially available to use in communicating with the internet, not all individuals have access to this equipment. On the other hand, almost everyone can get to a telephone with relative ease. There are innumerable pay telephones, as well as cell and conventional residential and business phones in existence. So even where no computers, facsimile machines, or modems are available, frequently a telephone is easy to find. Therefore it would be desirable to provide a means to access internet services from a conventional telephone, without the need for expensive and possibly unavailable equipment such as a computer or a modem.

One situation where such a capability could be handy might be where a consumer is shopping for a car or major appliance (or computer, for that matter), and wishes to comparison shop, via the internet, the model(s) in which he is interested. The store in which the consumer is shopping might require written confirmation of competing quotes for price-matching purposes. In this situation it would be useful for the consumer to pick up a phone and call a telephone-accessible secretarial service which has access to the internet, e-mail communications and facsimile capability. The consumer could instruct the secretarial service to perform the requisite research on the internet while the consumer waits, and then telephone, e-mail or fax the results to the destination specified by the consumer.

Another situation where an individual could benefit from internet access and/or digital communications capability via a telephone secretarial service would be where that individual is traveling via airline or other conveyance and only telephone communication is available. Under those conditions, a telephone-accessible internet secretarial service would allow the individual to vicariously research the internet, and send e-mails and facsimiles.

In short, anywhere an individual has access to a telephone, but not digital communications capability, it could be useful to be able to call a telephone-accessible internet secretarial service, be it for internet research, or for digital communications. One major problem associated with the accomplishment of this function has been the lack of a good, user-friendly way to bill the user for the secretarial services provided.

SUMMARY OF THE INVENTION

Accordingly, it is an object of the present invention to provide a method of telephone access to internet secretarial services which permits the client to access the internet by means of the secretarial service. Design features allowing this object to be accomplished include the method steps of the client calling an internet secretary, the internet secretary performing the requisite research, and the internet secretary sending and/or explaining the results to the client. Advantages associated with the accomplishment of this object include the client being able to obtain internet information quickly and easily, without having a computer or modem.

It is another object of the present invention to provide a method of telephone access to internet secretarial services which permits information to be faxed, sent via pager, e-mailed, etc. to a destination of the client's choosing. Design features allowing this object to be accomplished include the method steps of the client requesting that the internet secretary send information to a third party destination specified by the client, and the internet secretary so doing. A benefit associated with the accomplishment of this object is the ability to obtain information via facsimile, pager, e-mail, etc., including information down-loaded from the internet, without having to have a computer or modem.

It is still another object of this invention to provide a method of telephone access to internet secretarial services which provides for quick and user-friendly payment for the internet secretarial services. Design features enabling the accomplishment of this object include the method steps of using toll telephone lines for the client to call the internet secretary, the telephone company remitting secretarial services charges to the internet secretary, and the client in turn paying the telephone company for the telephone service costs. Alternately, the client could pay telephone service costs using a credit card or a debit card. An advantage associated with the realization of this object is consumer convenience.

It is yet another object of this invention to provide a method of telephone access to internet secretarial services which uses existing equipment. Design features allowing this object to be achieved include the use of existing telephone lines, telephone services providers, and client credit and/or debit cards. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIG. 2. Sheet three contains FIG. 3. Sheet four contains FIG. 4.

FIG. 1 is a diagrammatic view of the instant method of telephone access to internet secretarial services using toll telephone lines and client credit card and/or debit card information.

FIG. 2 is a diagrammatic view of the instant method of telephone access to internet secretarial services using toll telephone lines and client credit card and/or debit card information, wherein information is sent to one or more third parties.

FIG. 3 is a diagrammatic view of the instant method of telephone access to internet secretarial services using toll-free telephone lines and client credit card and/or debit card information.

FIG. 4 is a diagrammatic view of the instant method of telephone access to internet secretarial services using toll-free telephone lines and client credit card and/or debit card information, wherein information is sent to one or more third parties.

DETAILED DESCRIPTION OF THE PREFERRED EMBODIMENT

FIG. 1 is a diagrammatic view of the instant method of telephone access to internet secretarial services using toll telephone lines and client credit card information 18 and/or client debit card information 30. In practice, client 20 calls internet secretary 22 using toll telephone lines, such as a "900" number. Client 20 then verbally makes client information request 2 of internet secretary 22, and internet secretary 22 performs the task requested on internet 24, by sending internet search inquiry 4 to internet 24. Search results 6 from internet 24 are then returned to internet secretary 22, who communicates same to client 20 by means of search results from internet secretary 8.

Call rate and time information 10 is tracked by telephone company 26, who charges client 20 via invoice for telephone services 50 to client. Client 20 remits telephone service costs 14 and secretarial service charges 12 to telephone company 26. In turn, telephone company 26 remits secretarial services charges 12 to internet secretary 22. Specific internet secretary charges may be charged to client using client credit card information 18 and/or client debit card information 30 supplied by client 20 to internet secretary 22.

FIG. 2 is a diagrammatic view of the instant method of telephone access to internet secretarial services using toll telephone lines and client credit card information 18 and/or client debit card information 30, wherein information 16 is sent to one or more third parties 28 by internet secretary 22 on behalf of client 20. The same functions described above in relation to the method embodiment depicted in FIG. 1 are available. In addition, client 20 can instruct internet secretary 22 to send information 16 to one or more third parties 28. Information 16 may be in the form of e-mail, pager messaging, facsimile transmissions, mailed copies of text and/or web pages, etc. Client 20 pays the cost of these transmissions to third parties 28 by means of client credit card information 18 and/or client debit card information 30 sent from client 20 to internet secretary 22. It is contemplated to be within the scope of this invention for third parties 28 to include any destination specified by client 20, e.g. a computer terminal or facsimile machine in a store where client 20 is shopping, a destination geographically remote from client 20, etc.

FIG. 3 is a diagrammatic view of the instant method of telephone access to internet secretarial services using toll-free telephone lines and client credit card information 18 and/or client debit card information 30. In practice, client 20 calls internet secretary 22 using toll-free telephone lines, such as an "800" or "888" number. Client 20 then verbally makes client information request 2 of internet secretary 22, and internet secretary 22 performs the task requested on internet 24, by sending internet search inquiry 4 to internet 24. Search results from internet 6 are then returned to internet secretary 22, who communicates same to client 20 by means of search results from internet secretary 8.

Call rate and time information 10 are tracked by telephone company 26, who sends invoice for telephone services 50 to internet secretary 22, who in turn remits telephone service costs 14 to telephone company 26. Client credit card information 18 card/or debit card information 30 is sent to internet secretary 22, who uses same to charge client 20 for secretarial services charges 12. Client 20's debit card could be a bank issued debit card or a debit card issued by internet secretary 22.

FIG. 4 is a diagrammatic view of the instant method of telephone access to internet secretarial services using toll-free telephone lines and client credit card information 18 and/or client debit card information 30, wherein information 16 is sent to one or more third parties 28 by internet secretary 22 on behalf of client 20. The same functions described above in relation to the method embodiment depicted in FIG. 3 are available. In addition, client 20 can instruct internet secretary 22 to send information 16 to one or more third parties 28. Information 16 may be in the form of e-mail, pager messaging, facsimile transmissions, mailed copies of text and/or web pages, etc. Client 20 pays the cost of these transmissions to third parties 28 by means of client debit card information 30, or by means of client credit card information 18, sent from client 20 to internet secretary 22. It is contemplated to be within the scope of this invention for third parties 28 to include any destination specified by client 20, e.g. a computer terminal or facsimile machine in a store where client 20 is shopping, a destination geographically remote from client 20, etc.

Thus, as is illustrated in FIGS. 1–4, the instant method of telephone access to internet secretarial services comprises the following steps:

A. Sending a client information request from a client to an internet secretary, using toll telephone lines;

B. Sending an internet search query from the internet secretary to an internet;

C. Sending search results from the internet to the internet secretary;

D. Sending search results from the internet secretary to the client;

E. Tracking call rate and time information by a telephone company;

F. Remitting secretarial services charges from the telephone company to the internet secretary; and G. Remitting telephone services costs from the client to the telephone company.

In addition, a variation on the above method may comprise the further steps of:

H. Sending a request from the client to the internet secretary for the internet secretary to send information to one or more third parties (which information may be in the form of e-mail, facsimiles, pager messages, mailed copies of text and/or web pages, etc.);

I. Sending client credit card information and/or debit card information from the client to the internet secretary; and J. Using the client credit card information and/or the client debit card information to charge the client for the information sent by the internet secretary to one or more third parties on behalf of the client.

The instant method of telephone access to internet secretarial services also comprises an alternate embodiment method comprising the following steps:

A. Sending a client information request from a client to an internet secretary, using toll-free telephone lines, B. Sending an internet search query from the internet secretary to an internet;

C. Sending search results from the internet to the internet secretary;

D. Sending search results from the internet secretary to the client;

E. Tracking call rate and time information by a telephone company;

F. Debiting the client's debit card or charging the client's credit card for secretarial services charges;

G. Invoicing the internet secretary for the telephone services; and

H. Remitting telephone services costs from the internet secretary to the telephone company.

In addition, a variation on the above method may comprise the further steps of:

I. Sending a request from the client to the internet secretary for the internet secretary to send information to one or more third parties (which information may be in the form of e-mail, facsimiles, pager messaging, mailed copies of text and/or web pages, etc.);

J. Sending client credit card information and/or debit card information from the client to the internet secretary; and K. Using the client credit card information and/or debit card information to charge the client for the information sent by the internet secretary to one or more third parties on behalf of the client.

While a preferred embodiment of the invention has been illustrated herein, it is to be understood that changes and variations may be made by those skilled in the art without departing from the spirit of the appending claims.

| DRAWING ITEM INDEX | |
|---|---|
| 2 | client information request |
| 4 | internet search query |
| 6 | search results from internet |
| 8 | search results from internet secretary |
| 10 | call rate and time information |
| 12 | secretarial services charges |
| 14 | telephone service costs |
| 16 | information |
| 18 | client credit card information |
| 20 | client |
| 22 | internet secretary |
| 24 | internet |
| 26 | telephone company |
| 28 | third party |
| 30 | client debit card information |
| 50 | invoice for telephone services |

I claim:

1. A method of telephone access to internet secretarial services comprising the following steps:
   A. Sending verbal client information request from a human client to a human internet secretary, using toll telephone lines;
   B. Sending an internet search query from said internet secretary to an internet;
   C. Sending search results from said internet secretary;
   D. Sending search results from said internet secretary to said client;
   E. Tracking call rate and time information by a telephone company;
   F. Remitting telephone services costs and secretarial services charges from said client to said telephone company; and
   G. Remitting secretarial services charges from said telephone company to said internet secretary.

2. The method of telephone access to internet secretarial services of claim 1 comprising the further steps of:
   H. Sending a request from said client to said internet secretary requesting that said internet secretary send information to one or more third parties;
   I. Sending client credit card information and/or debit card information from said client to said internet secretary; and
   J. Using said client credit card information and/or debit card information to charge said client for said information sent by said internet secretary to said one or more third parties on behalf of said client.

3. The method of telephone access to internet secretarial services of claim 2 wherein said information comprises e-mail transmissions.

4. The method of telephone access to internet secretarial services of claim 2 wherein said information comprises facsimile transmissions.

5. The method of telephone access to internet secretarial services of claim 2 wherein said information comprises transmission of pager messages.

6. The method of telephone access to internet secretarial services of claim 2 wherein said information comprises mailed copies of text and/or web pages.

7. An alternate embodiment method of telephone access to internet secretarial services comprising the following steps:
   A. Sending a verbal client information request from a human client to a human internet secretary, using toll-free telephone lines;
   B. Sending an internet search query from said internet secretary to an internet;
   C. Sending search results from said internet to said internet secretary;
   D. Sending search results from said internet secretary to said client;
   E. Tracking call rate and time information by a telephone company;
   F. Remitting telephone services costs from said internet secretary to said telephone company;
   G. Sending client credit card information and/or debit car information from said client to said internet secretary and;
   H. Using said client credit car information and/or debit card information to charge said client for secretarial service charges.

8. The method of telephone access to internet secretarial services of claim 7 comprising the further steps of:
   I. Sending a request from said client to said internet secretary requesting that said internet secretary send information to one or more third parties; and
   J. Using said client credit card information and/or said client debit card information to charge said client for said information sent by said internet secretary to said one or more third parties on behalf of said client.

9. The method of telephone access to internet secretarial services of claim 8 wherein said information comprises e-mail transmissions.

10. The method of telephone access to internet secretarial services of claim 8 wherein said information comprises facsimile transmissions.

11. The method of telephone access to internet secretarial services of claim 8 wherein said information comprises transmission of pager messages.

12. The method of telephone access to internet secretarial services of claim 8 wherein said information comprises mailed copies of text and/or web pages.

* * * * *

UNITED STATES PATENT AND TRADEMARK OFFICE
CERTIFICATE OF CORRECTION

PATENT NO.     : 6,542,589 B1
DATED          : April 1, 2003
INVENTOR(S)    : Baskin, Douglas M.

It is certified that error appears in the above-identified patent and that said Letters Patent is hereby corrected as shown below:

Column 5,
Line 47, "A. Sending verbal client information request…" should be
-- A. Sending a verbal client information request… --
Line 53, "C. Sending search results from said internet secretary;" should be
-- C. Sending search results from said internet to said internet secretary; --

Column 6,
Line 38, "…debit car…" should be -- ……debit card… --
Line 41, "…credit car…" should be -- ……credit card.. --

Signed and Sealed this

Fourth Day of November, 2003

JAMES E. ROGAN
*Director of the United States Patent and Trademark Office*